Jan. 7, 1958 — E. P. JONES — 2,819,065
AWNING WINDOW STRUCTURE
Filed May 25, 1954 — 6 Sheets-Sheet 1

INVENTOR
EARL P. JONES
BY Moore, Prangley & Clayton
ATTORNEYS

Jan. 7, 1958     E. P. JONES     2,819,065
AWNING WINDOW STRUCTURE

Filed May 25, 1954     6 Sheets-Sheet 2

INVENTOR
EARL P. JONES
BY Moore, Prangley & Clayton
ATTORNEYS

Jan. 7, 1958 E. P. JONES 2,819,065
AWNING WINDOW STRUCTURE
Filed May 25, 1954 6 Sheets-Sheet 3

INVENTOR
EARL P. JONES
BY Moore, Prangley & Clayton
ATTORNEYS

Jan. 7, 1958     E. P. JONES     2,819,065
AWNING WINDOW STRUCTURE Filed May 25, 1954     6 Sheets-Sheet 4

INVENTOR
EARL P. JONES
BY Moore, Prangley & Clayton
ATTORNEYS

Jan. 7, 1958    E. P. JONES    2,819,065
AWNING WINDOW STRUCTURE
Filed May 25, 1954    6 Sheets-Sheet 5

FIG. 13

INVENTOR
EARL P. JONES
BY Moore, Prangley & Clayton
ATTORNEYS

Jan. 7, 1958  E. P. JONES  2,819,065
AWNING WINDOW STRUCTURE
Filed May 25, 1954  6 Sheets-Sheet 6

INVENTOR
EARL P. JONES
BY Moore, Prangley & Clayton
ATTORNEYS

United States Patent Office 2,819,065
Patented Jan. 7, 1958

2,819,065

AWNING WINDOW STRUCTURE

Earl P. Jones, Fort Lauderdale, Fla., assignor to Gate City Sash and Door Company, Fort Lauderdale, Fla., a corporation of Florida Application May 25, 1954, Serial No. 432,269

10 Claims. (Cl. 268—23)

This invention relates to windows and particularly to awning-type windows and operating mechanism therefor.

The window of the present invention is of the type including a substantially rectangular frame within which and on which are hung two or more window sashes. The sashes are pivoted about a horizontal axis near the upper edge thereof. Mechanism is provided along the sides of the frame and sashes to pivot the sashes outwardly about the upper pivot, that is, the lower edges of the sashes are swung outwardly and upwardly about the pivot point adjacent the upper edges of the sashes.

In windows of this type one of the sashes may become warped or for some other reason may fail to close completely. It is desirable nonetheless to close the remaining sashes. If a fixed drive linkage is utilized, jamming of one of the sashes in the opened position will ordinarily prevent closure of the normally operating sashes.

It is desirable in many installations to install the window frame in the wall opening before the window sashes and the sash operating mechanism is mounted on or within the frame. This type of structure also permits the frame to be shipped in an unassembled or knocked down condition to the point of installation.

The operating mechanism for windows of this type which have been utilized heretofore is ordinarily only partly concealed within the frame or is not concealed at all. Thus the operating mechanism or a portion thereof is presented to view from either the outside of the window or the inside of the window or both. The presence of this exposed operating mechanism detracts from the appearance of the window installation and the surrounding structure.

Therefore it is an object of the present invention to provide an improved awning window structure and particularly an improved awning window structure having the major part thereof formed of a metal, preferably aluminum.

Another object of the invention is to provide a window sash operating mechanism which will permit closing of the normally operating sashes even though one of the sashes is warped or otherwise jammed in the opened position.

In conjunction with the foregoing object it is another object of this invention to provide a window operating mechanism of the type set forth in which the mechanism provides positive operation of both sides of each window sash, the mechanism being operated by a handle positioned in the center of the frame at the extreme bottom of the sill.

Still another object of the invention is to provide a window of the type set forth in which the sash operating mechanism is electrically operated.

Yet another object of the invention is to provide in an awning-type window a hollow rigid metal frame, preferably of aluminum, with corner braces to insure squareness of the frame.

In conjunction with the foregoing object it is another object of this invention to provide a frame of the type set forth which can be shipped disassembled and thereafter assembled on the job, the corners of the sill of the frame being sealed to prevent leakage into the surrounding masonry or walls.

Yet another object of the invention is to provide a window structure of the type set forth in which the window frame can be installed in the associated building opening without having the window sashes and sash operating mechanism attached thereto, the window sashes and sash operating mechanism being installed after the frame is in final position.

Still another object of the invention is to provide a frame for an awning-type window in which no screws, rivets or other fasteners are present on the inside or outsides faces of the frame to detract from the appearance thereof or hinder cleaning thereof.

Still another object of the invention is to provide a window of the type set forth in which the sash operating mechanism is concealed within the frame so that no unsightly projecting arms or locking devices detract from the appearance of the window inside or outside, opened or closed.

In connection with the foregoing objects it is a further object of the invention to provide a sash operating mechanism completely concealed within the frame in which the operating mechanism is completely and easily accessible from the inside of the building in which the window is installed by removing portions of the frame.

A further object of the invention is to provide an improved sash in the window of the type set forth and particularly an improved method and structure for retaining the glass or other glazing in position on the sash, the glazing structure being easily removable to replace broken glass and presenting a pleasing and artistic appearance.

A further object of the invention is to provide in a window of the type set forth a sash and sash mounting which is completely weathertight and will prevent entry of rain and particularly will prevent entry of rain by splashing over the uppermost window sash when the sash is in the opened position.

A still further object of the invention is to provide in an aluminum awning window of the type set forth non-aluminum bearings and insulation between the aluminum parts that must move relative to each other.

These and other objects and advantages of the present invention will be better understood from the following description when taken in conjunction with the accompanying drawings. In the drawings wherein like reference numerals have been utilized to refer to like parts throughout.

Figure 1:
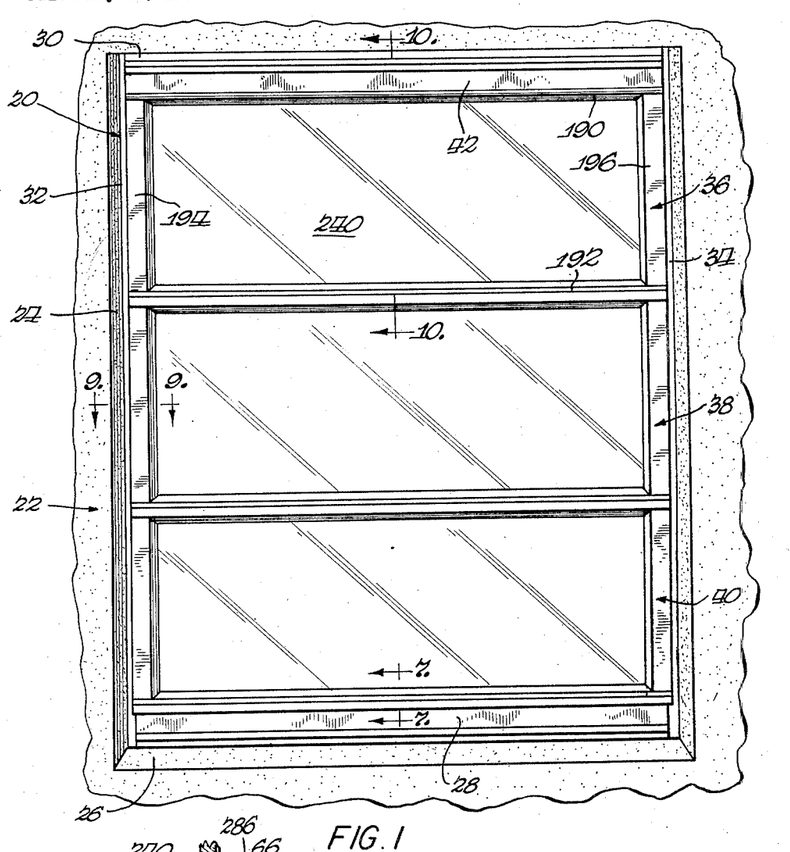
Fig. 1 is an elevation view of a window made in accordance with and incorporating the principles of the present invention, the window being installed in operative position and viewed from the outside.

Referring first to Fig. 1, the general construction and installation of an awning window made according to the present invention will be described.

The window generally designated by the numeral 20 is mounted in a precast cement frame 22 which is in turn supported by a building wall formed of brick or cement blocks. The window of the present invention is particularly adapted to be used with and fitted in such precast cement frames but it is to be understood that the window can be used with other types of seatings. The cement frame is beveled inwardly and rearwardly on the vertical edges as at 24 and on the lower edge as at 26. The frame of window 20 completely fills and interfits with cement frame outline defined by the beveled edges 24 and 26.

The frame of the window 20 comprises generally a sill 28 positioned at the bottom and a head 30 positioned at the top which are joined by a pair of vertically extending jambs 32 and 34. Positioned within the frame are three window sashes 36, 38 and 40 which are provided with pivots adjacent their upper edges. The upper edge of the uppermost sash 36 is concealed and covered by a rain cap 42 which will be described more fully hereinafter and which serves to prevent rain from being blown or splashed over the top of sash 36 in either an opened or closed position.

Figures 3, 4, 5, 6:
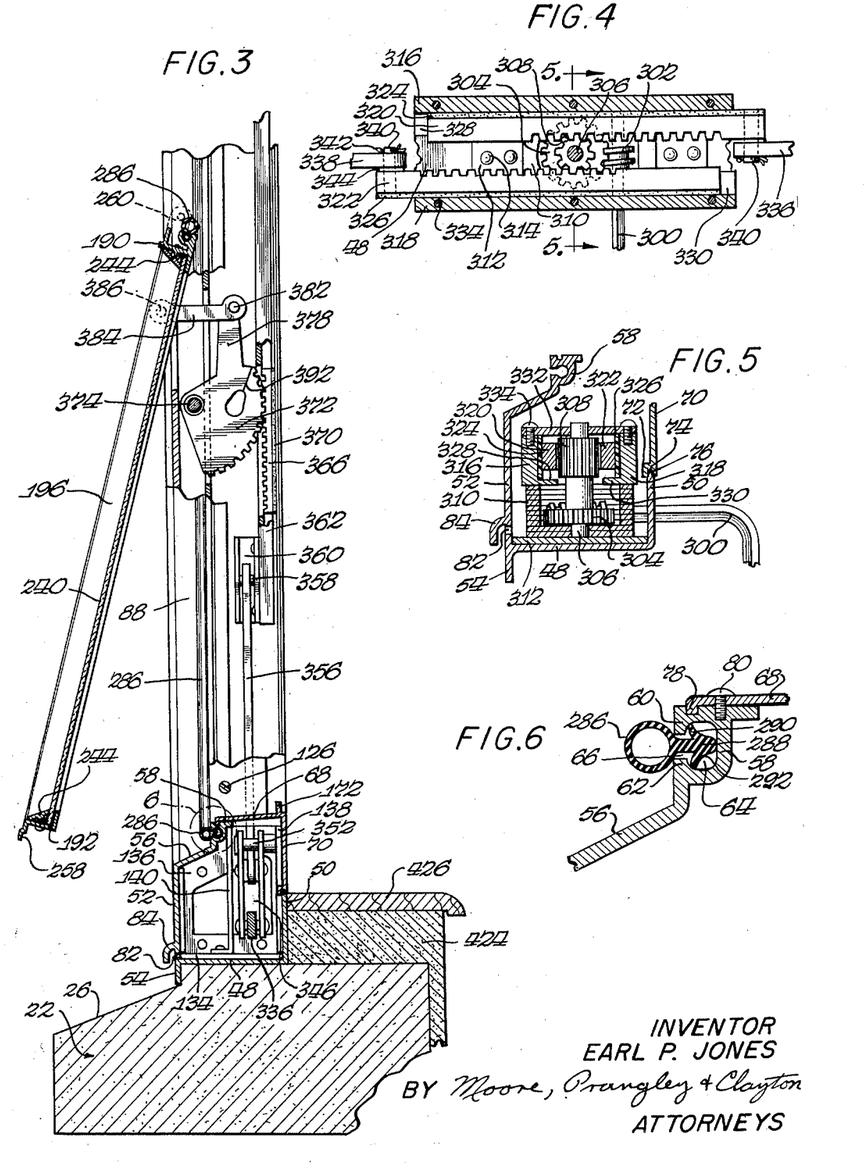
Fig. 3 is a partial view in vertical section substantially as seen in the direction of the arrows along the line 3—3 of Fig. 2, the lower sash being shown in the open position.
Fig. 4 is a partial view in horizontal section of a portion of the operating mechanism substantially as seen in the direction of the arrows along the line 4—4 of Fig. 2.
Fig. 5 is a partial view in vertical section as seen in the direction of the arrows along the line 5—5 of Fig. 4.
Fig. 6 is an enlarged view of the structure shown within the dot-dash circle of Fig. 3 and illustrating the construction of the weather stripping for the lower edge of the lowermost window sash.

Referring now more particularly to Figs. 3, 13, 14 and 15, the construction of the frame will be described in detail. The sill 28 comprises two elongated continuous aluminum extrusions forming a front piece 44 and a cover 46, see Fig. 13. The front piece 44 has a normally horizontally disposed bottom 48 on the rear or inwardly disposed edge of which is formed an upstanding wall 50. Wall 50 will be positioned to face into the room when the window is installed and has the major portion thereof concealed as may be best seen in Fig. 3 in certain types of installations. The forwardly or outwardly facing edge of the bottom 48 joins a forward wall 52 intermediate the ends thereof so that a downwardly extending flange 54 is provided. Referring to Fig. 3 it will be seen that flange 54 fits over and covers a portion of the cement frame 22. Wall 52 extends substantially parallel to wall 50 and is substantially higher than wall 50. A rearwardly slanting wall 56 joins the upper edge of wall 52 and extends rearwardly toward the plane of wall 50.

There is formed on the upper and rearwardly extending edge of wall 56 a groove for receiving a piece of weatherstripping as is best illustrated in Fig. 6. The weatherstripping is received by a substantially C-shaped extrusion including a wall 58 having a pair of inwardly directed flanges 60 and 62 which define an elongated opening through which the weatherstripping extends. More particularly wall 58 in cooperation with flanges 60 and 62 provide an oval groove 64 having a slot 66 extending along the forwardly facing portion thereof.

Front piece 44 as described above is a single extrusion and when fitted with cover 46 forms an enclosed and rigid hollow sill. Cover 46 has a top wall 68 which has formed along the rearwardly disposed edge thereof a right angularly disposed vertical wall 70. The lower edge of wall 70 has an inwardly L-shaped extension 72 formed thereon which, in cooperation with a portion of wall 70, forms a groove 74. The width of groove 74 as viewed in Fig. 5 is slightly less than the thickness of wall 50. Wall 50 has a groove formed along the inner edge thereof to provide a narrow tongue 76 which is adapted to fit into the groove 74 formed on the lower edge of cover wall 70. This groove and tongue arrangement provides a close fit between front pieces 44 and cover 46.

Figure 13:
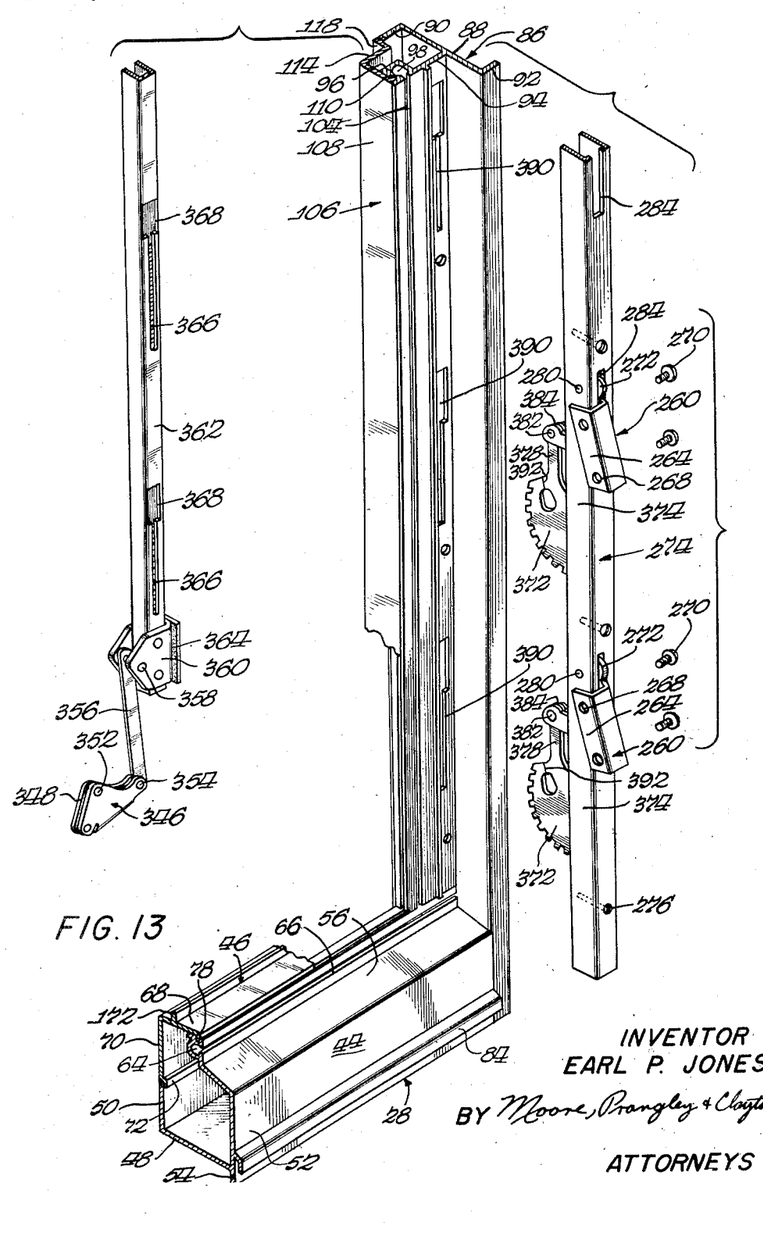
Fig. 13 is a fragmentary perspective exploded view illustrating the sash operating mechanism of the present invention and its relationship to the window frame.

The forwardly extending edge of wall 68 has a downturned flange 78 extending therealong which is adapted to fit into a groove formed in front piece 44, see Figs. 6 and 13. Flange 78 and its associated groove form a tight fit for the forward edge of cover 46 where it contacts front piece 44. The cover 46 is fastened to front piece 44 by a series of screws 80 which pass through cover wall 68 and into a threaded aperture in wall 58, see particularly Fig. 6.

Although precautions are taken to exclude moisture from within the frame and particularly sill 28, some moisture will collect therein and escape for the collected moisture is provided by a series of holes 82 formed in wall 52 above the bottom 48. In order to prevent rain or other moisture from being driven or splashed onto sill 88 through holes 82 a downwardly extending and curved cover flange 84 is formed on wall 52 and extends downwardly over but spaced from holes 82.

Figures 14, 15, 16, 17:
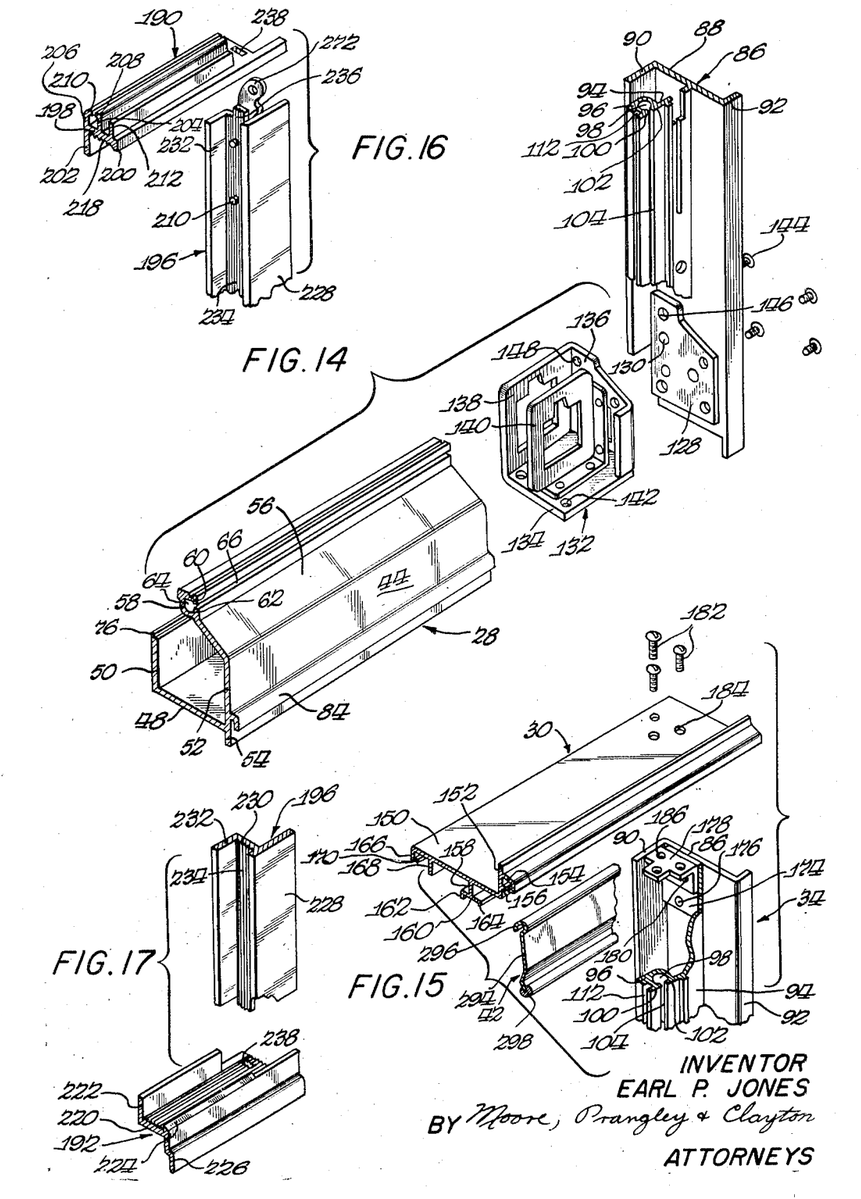
Fig. 14 is a perspective partial exploded view illustrating the construction of a lower corner of the window frame of the present invention.
Fig. 15 is a partial perspective exploded view showing the upper corner of the window frame of the present invention.
Fig. 16 is a partial perspective exploded view showing the manner of the construction of the upper corner of a sash of the present invention.
Fig. 17 is a fragmentary perspective exploded view illustrating the construction of a lower corner of the window sash of the present invention.

Referring now particularly to Figs. 13, 14 and 15 the construction of side jamb 34 will be described in detail. It is to be understood that jamb 32 has the same construction but is the mirror image of jamb 34. Jamb 34 comprises a first unitary aluminum extrusion 86, the cross section of which can be best seen in Figs. 14 and 15. A central wall 88 is provided and on each end has oppositely directed flanges 90 and 92. Flange 90 is substantially longer than flange 92. Formed intermediate the ends of walls 88 and extending parallel to flange 90 is a central flange 94 on the free end of which is formed a weatherstrip receiving member 96. The weatherstrip receiving member 96 is substantially C-shaped in cross section providing a groove 98 defined by two inwardly inturned flanges 100 and 102 providing an elongated slot 104 through which the weatherstrip extends.

A jamb cover 106, see Fig. 13, is provided to enclose the portion beside the jamb defined by flanges 90 and 94. Jamb cover 106 includes a side wall 108 having an inturned flange 110 which cooperates with a groove 112 formed in the weatherstrip receiving portion 96. The other side of wall 108 has a perpendicularly disposed flange 114 formed thereon which in turn terminates in a flange 118 extending substantially parallel to wall 108. The end of flange 118 has a pair of parallel flanges 120 and 122 formed thereon and defining a groove (see Fig. 9). This groove receives a tongue 124 formed on the outer free edge of flange 90 on jamb piece 86. A screw 126 passes through cover 106 and into the weatherstrip retaining member 96 to secure cover 106 on jamb piece 86.

One of the important features of the present invention is the manner in which jamb piece 86 is interfitted with the hollow sill 28 so that a square corner can be obtained on the job when the frame is assembled. To this end the central flange 94 on jamb 86 is cut away adjacent the lower end thereof and there is welded to the smooth surface formed thereby a plate 128 whose outline is shaped like the inner periphery of sill 28. Plate 128 is affixed to jamb piece 86 by means of rivets 130 whose outer ends are made flush with the outer side of central wall 88.

There is provided within sill 28 a bracket generally designated by the numeral 132. Bracket 132 has a base 134 on which is secured an upstanding plate 136 which is shaped identically with plate 128. Formed perpendicular to both base 134 and plate 136 are a pair of spaced apart plates 138 and 140 which provide rigidity and means for mounting part of the sash operating mechanism to be described hereinafter. Base 134 and plates 136, 138 and 140 are secured together and plate 134 is, in addition, secured to the bottom 48 of sill 28 by means of fasteners fastened in apertures 142. When sill 28 is moved up until the free end thereof fits over plate 128 on jamb piece 86, the sill and jamb are perfectly aligned in a perpendicular right angular relationship. They can be held in this position by a plurality of metal screws 144 which pass through aligned apertures 146 in plate 128 and 148 in plate 136. The central wall 88 is countersunk around the apertures to receive screws 144 so that the heads of screws 144 are flush with the outer edge of wall 88.

Referring now to Fig. 15 the construction of head 30 and its connection to jamb 34 will be described. Head 30 is a single one piece aluminum extrusion including a top wall 150. The outwardly facing edge of wall 150 has a vertically extending flange 152 formed thereon and extending substantially perpendicular therewith. Extending forwardly from flange 152 are a pair of flanges 154 and 156 which cooperate to form a support for the rain cap 42 (see also Fig. 10).

Intermediate the edges of top wall 150 is a depending flange 158 which supports a weatherstrip contact member including a horizontal portion 160 provided with two depending flanges 162 and 164. On the rear edge of top wall 150 is another depending flange 166 and beside it and spaced inwardly therefrom is another depending flange 168. Flanges 166 and 168 cooperate to form a screen receiving channel. As may be best seen in Fig. 10 the lower edge of depending flange 166 has an inturned flange 170 formed thereon extending substantially parallel to top wall 150. Flange 170 is useful in mounting certain types of screens that can be used with the window frame of this invention. A screen can be held in operating position by insertion in the channel formed between flanges 166 and 168 and is further held in position by a flange 172 extending upwardly from cover wall 68, see Fig. 3.

The manner in which jamb 34 is connected to head 30 is best illustrated in Fig. 15. Flange 94 on jamb piece 86 is cut away adjacent the top end thereof and there is fastened to wall 88 a mounting plate 174 secured thereto by rivets 176. Attached to mounting plate 174 is a corner bracket 178 which is L-shaped in cross section and is attached to mounting plate 174 by a plurality of screws 180.

The flanges 158, 166 and 168 on top plate 150 of head 30 are cut away for a distance to accommodate the corner bracket 178. This permits top plate 150 to fit snugly against the adjacent and parallel portion of corner bracket 178. A plurality of metal screws 182 pass through aligned apertures 184 and 186 in top plate 150 and corner bracket 178, respectively, to fasten top plate 150 firmly to the corner bracket 178.

From the above it will be seen that there has been provided an aluminum frame having a completely enclosed hollow sill and two completely enclosed hollow side jambs. The method of joining the jambs to the sill insure that the jambs and the sill are disposed at right angles to each other. The addition of the accurately made head 30 forms a rigid rectangular frame.

The construction of the uppermost window sash 36 will now be described by particular reference to Figs. 9, 10, 16 and 17. Sash 36 includes an upper rail 190 and a lower rail 192 which are joined by side rails 194 and 196, see Fig. 1. The cross section of top rail 190 can be best seen in Fig. 10 and includes a top wall 198 which extends substantially the entire length of sash 36 and is provided with a downwardly extending front flange 200 and a downwardly extending rear flange 202. A pair of upwardly extending flanges 204 and 206 define a weatherstrip retaining channel and are each provided with an inturned flange 208 and 210, respectively, see Fig. 16. A third upstanding flange 212 is also formed on top wall 198. The inner surface of wall 198 is formed with a plurality of minute grooves as at 214 to form a roughened surface for a purpose which will be more fully explained later.

Referring again to Fig. 10 the cross section of bottom rail 192 will be described in detail. The bottom rail 192 includes a central wall 220 having on the inner edge an upstanding flange 222 and on the outer edge an upstanding flange 224. Extending downwardly from flange 224 is a forwardly offset flange 226 which overlaps the upper rail of sash 38.

The cross section of the vertical rails 194 and 196 can best be seen from Fig. 17 wherein there is provided a front wall 228 intermediate the edges of which is formed a perpendicularly extending side wall 230. On the other edge of wall 230 is formed a perpendicularly extending flange 232 which extends substantially parallel to front wall 228. The inwardly facing surface of wall 230 is serrated or grooved as at 234 for a purpose which will be more fully explained later.

Top rail 190, bottom rail 192 and the side rails 194—196 are assembled to form a rectangular opening by cutting away the flanges where necessary and providing tongues such as tongue 236 (see Fig. 16) on the side rails 194—196 which extend into slots such as slots 238 formed in the upper rail 190 and the lower rail 192. After the tongues have been inserted in the slots, the tongues are bent over to join the rails in a permanent manner to form the sash.

Figure 10:
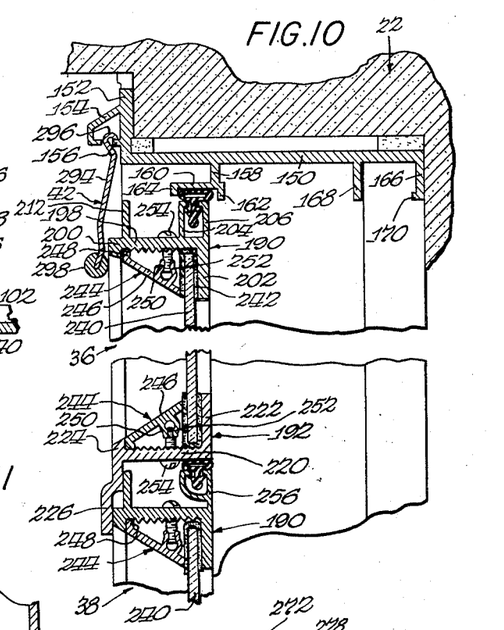
Fig. 10 is a fragmentary enlarged view in vertical section substantially as seen in the direction of the arrows along the line 10—10 of Fig. 1.

A suitable glazing material such as a sheet of glass 240 is provided and having outer dimensions such that it can fit within the area defined by flanges 200, 224 and 228. The edges of the glass which come in contact with the rails are covered with a felt material having an adhesive applied thereto as at 242. This felt material preserves the edges of the glass and also serves to seal against moisture and drafts. The glass 240 is positively held in position by a plurality of glazing strips 244 which are identical in construction no matter where used and whose cross section is illustrated in Fig. 10. More particularly the glazing strip 244 has a substantial body 246 on one edge of which is formed a flange 248 extending at substantially 135 degrees with respect to the plane of body 246. Also formed on body 246 are a pair of longitudinally extending flanges 250 and 252 which form a groove therebetween to receive a plurality of metal screws 254. Screws 254 pass through holes in the bodies of the rails and the threads thereon are received between flanges 250 and 252 to form clamping contact therewith. When the glazing strips 244 are in installed position, flange 248 abuts against the forward flanges of the rails and the body 246 is disposed at substantially a 45 degree angle with respect to the surface of glass 240.

The above described method of applying glass 240 to the sashes is economical, easy to install and permits easy replacement of broken glazing. The glass or other glazing is firmly held in position in a sealed manner.

The construction of sash 38 is substantially identical to the construction of sash 36 with the one difference that a modified form of weatherstrip mounting member is provided. More specifically, referring to Fig. 10, a weatherstrip mounting member 256 having the configuration as illustrated is provided but functions in substantially the same manner as do the spaced apart flanges 204—206 present on the upper rail of sash 36.

Figure 7:
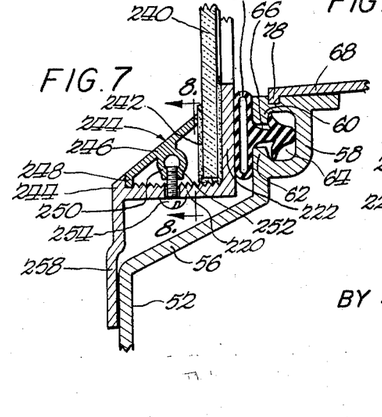
Fig. 7 is a partial enlarged view in vertical section as seen in the direction of the arrows along the line 7—7 of Fig. 1.
Figure 8:
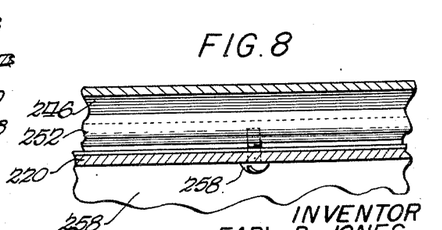
Fig. 8 is a view in vertical section as seen in the direction of the arrows along the line 8—8 of Fig. 7.

Sash 40 is also substantially identical with sash 36 in construction and differs only in that the downwardly extending flange on the lower edge of the lower rail is elongated to overlie wall 52 on sill 28. More particularly an elongated flange 258 is provided as can be best seen in Fig. 7.

Figure 12:
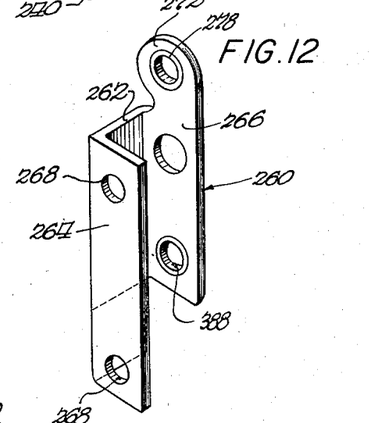
Fig. 12 is an enlarged perspective view of one of the sash hinges of the present invention.

Each of the sashes 36, 38 and 40 is attached to the vertical jambs 32 and 34 by means of a pair of hinge members, one of the hinge members being illustrated in Fig. 12. The hinge member which is generally designated by the numeral 260 includes a central plate 262 on which are formed a pair of flanges 264 and 266. Flange 264 has two apertures 268 formed therein which receive screws 270 (see Fig. 13) that attach the flange to the side rails 196, see Fig. 16.

Figure 9:
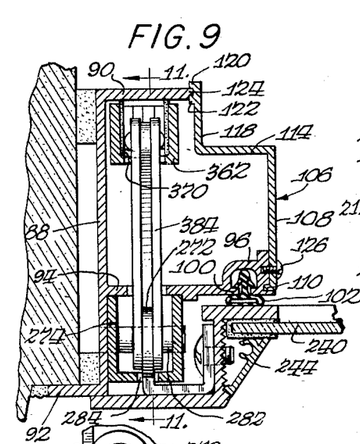
Fig. 9 is an enlarged partial view in horizontal section as seen in the direction of the arrows along the line 9—9 of Fig. 1.

The other hinge flange 266 is provided with an upstanding ear 272 which is pivotally connected to a mounting channel 274, see Figs. 9 and 13. Mounting channel 274 is substantially U-shaped in cross section and is positioned on and affixed to flange 94 of jamb 86 by a plurality of spaced apart metal screws 276. Ear 272 which is formed of aluminum is provided with an insert 278 that receives a pin 282 carried by mounting channel 274 (see Fig. 9). Ear 272 actually extends through a slot 284 formed in the web of channel 274. By providing a hinge such as hinge 260 at each side and at the upper edge of each vertical sash rail, each sash is hingedly mounted on and between jambs 32 and 34. The sashes overlap with the frame and with each other so that there is sealing completely around and over the entire surface of the window installation.

To increase the sealing between the sashes and the frame and between adjacent sashes where the sashes overlap, a weatherstrip is provided. The normal shape of the weatherstrip is best illustrated in Fig. 6 wherein it is seen that it includes a collapsible circular member 286 provided with a radially extending portion 288. Formed on each side of portion 288 and longitudinally thereof are retaining flanges 290 and 292 which ordinarily extend back toward the circular portion 286. When the flanges 290 and 292 are inserted within one of the weatherstrip retaining channels, they engage the flanges defining the channel and thereby hold the weatherstrip in operative position. When the windows are closed the circular portion 286 is collapsed, as may be seen best in Fig. 7, and provides an efficient seal.

The windows in opened position ordinarily overlie each other and thereby prevent rain from being blown in between the windows when the windows are open. Special provision however must be made for preventing rain from being blown over the top of the uppermost sash 36 when it is open. To this end the rain cap 42 has been provided. As may be best seen in Fig. 10, the rain cap 42 includes a body 294 having a hook 296 on the upper edge thereof. Hook 296 engages flange 156 on head 30 and forms a hinge connection therewith. The lower edge of body 294 is provided with a rounded strip of rubber-like or plastic material 298 which serves to cause the rain cap to swing downwardly against the upper sash 36 and insures quiet operation.

One preferred form of mechanism for opening and closing the window sashes will now be described in detail. There is provided a crank 300 which turns a worm 302 (see Fig. 4). Worm 302 engages a worm gear 304 which is fixedly attached to a shaft 306 which carries a smaller gear 308. Worm 302 and gear 306 are housed within an enclosure 310 made up from a plurality of aluminum plates. The plates have suitable apertures therein to accommodate the enclosed parts and are mounted on a base 312 which is attached by screws 314 to bottom 48 of the sill. Mounted on the top of enclosure 310 are a pair of guides 316 and 318 which support and carry a pair of racks 320 and 322 respectively. In order to prevent aluminum to aluminum contact each of the racks is provided with a non-metallic member 324 and 326 respectively made preferably of plastic. By reference to Fig. 5 it will be seen that the non-metallic inserts ride on inturned flanges 328 and 330 formed on guides 316 and 318 respectively and hold the racks 320 and 322 in proper operative relationship with the gear 308. A cover plate 332 is held in position by a plurality of screws 334 extending into the guides 316 and 318.

When handle 300 is rotated, worm 302 and worm gear 304 are rotated. This rotates gear 308 which in turn engages the racks 320 and 322. Rotation of gear 308 moves racks 320 and 322 in opposite directions as viewed in Fig. 4 and moves the racks the same distance for a given amount of turning of the crank 300.

Attached to the outwardly extending ends of the racks 320 and 322 are links 336 and 338 respectively which are held in position by pins 340 mounted on the racks. Cotter keys 342 are provided and non-metallic washers 344 are positioned between the links and the racks to prevent aluminum to aluminum contact.

The other ends of the links 336 and 338 are pivotally connected to bell cranks 346. Since the linkages on each side of the window are identical the same numerals will be applied to the same parts on both sides.

Figure 2:
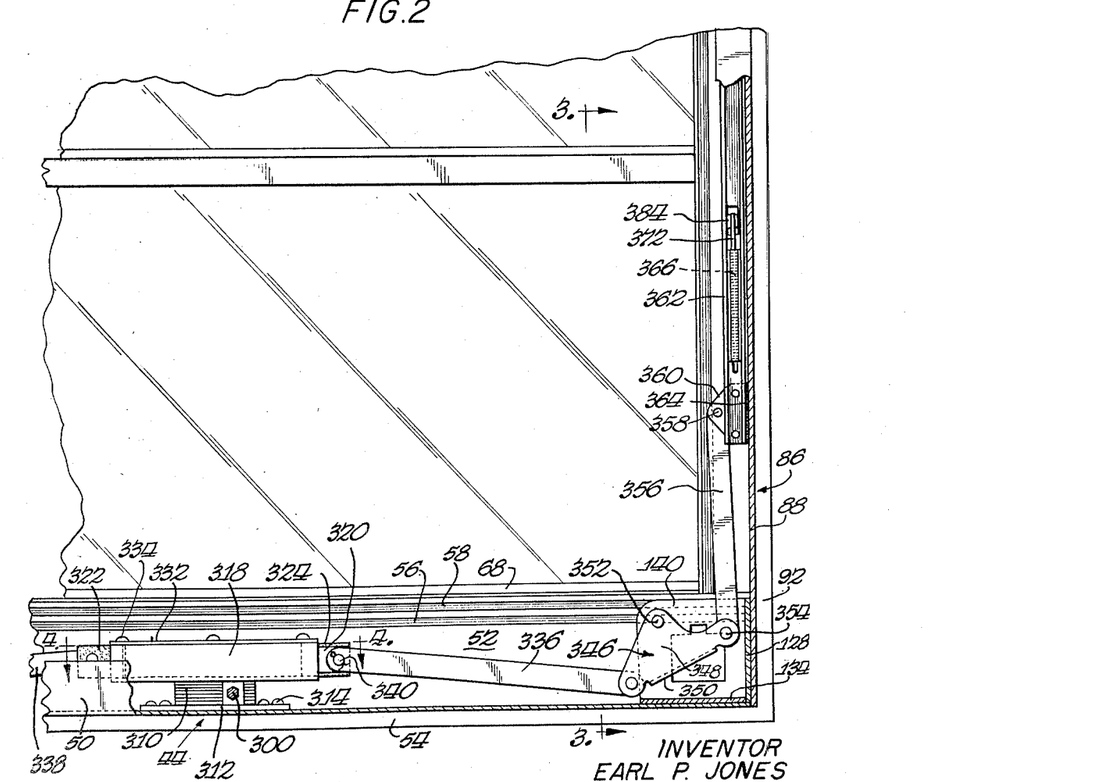
Fig. 2 is an enlarged fragmentary view of the window shown in Fig. 1 as seen from the inside with a part of the frame broken away to disclose the construction of the sash operating mechanism.

The construction of the bell crank 346 can be best seen from Figs. 2 and 13. The bell crank has a pair of identically shaped plates 348 joined by a central portion 350. It is mounted between the plates 138 and 140 mounted within sill 28 (see Fig. 3) and is pivoted to these plates at point 352. The other sides of the bell crank 346 are pivoted as at 354 to a substantially vertically extending link 356 whose upper end is pivoted as at 358 to a U-shaped bracket 360. Bracket 360 is fixedly attached to a channel 362 which is U-shaped in cross section, see Fig. 13. Channel 362 fits within the inner side of the vertical jamb as may be best seen in Fig. 9. One end of the bracket 360 is positioned toward wall 88 of the jamb and this end is provided with a fiber insert 364 (see Fig. 13) to prevent aluminum to aluminum contact at this point. Positioned within channel 362 and riveted thereto is a plurality of aluminum strips having teeth formed on the face thereof disposed toward the base of the channel 362 to form a rack 366. The teeth of rack 366 are accessible through an elongated slot 368 formed in channel 362 (see Fig. 11). To prevent aluminum to aluminum contact between channel 362 and flange 90 of the vertical jamb, a pair of non-metallic fiber inserts are provided beside the rack 366, these inserts 370 extending outwardly beyond the edges of the channel 362 and riding against flange 90 as may be best seen in Fig. 9.

By referring to Fig. 13 it will be seen that channel bar 362 extends above the lowermost window and in fact channel 362 extends upwardly beside all three of the window sashes. A rack 366 is provided for each window sash on each side thereof. The mechanism interconnecting channel 362 and rack 366 to each window sash is identical throughout and accordingly only one set of interconnecting linkage will be described in detail.

Figure 11:
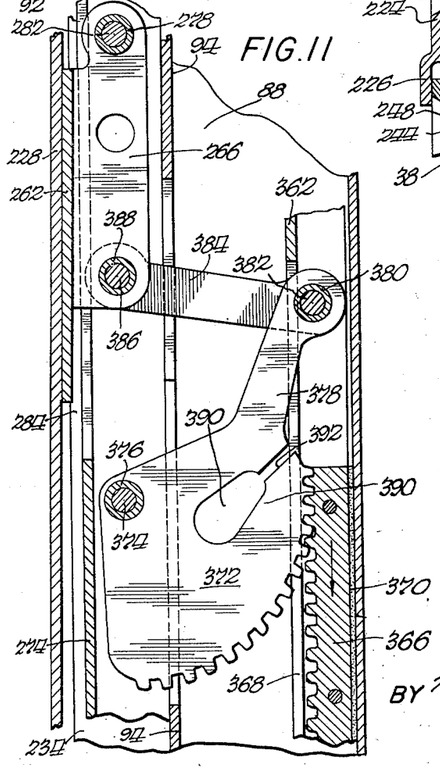
Fig. 11 is a further enlarged view of a portion of the sash operating mechanism substantially as seen in the direction of the arrows along the line 11—11 of Fig. 9 and illustrating the operation when the sash is jammed in a partially opened position.

Referring to Fig. 11 it will be seen that each rack 366 engages the teeth on a toothed sector generally designated by the numeral 372. Sector 372 is pivoted to the mounting channel 274 by a pin 374 which extends through an insert 376 mounted on sector 372. The center of pin 374 is the radius for the gear sector formed on sector 372. An arm 378 extends upwardly as viewed in Fig. 11 and carries an insert 380 through which extends a pin 382. Pin 382 engages a pair of hinge links 384 which are pivoted to flange 266 on hinge member 260 by means of a pin 386 extending through an insert 388 in hinge 260.

A description of the operation of the window actuating mechanism will now be given. Referring first to Fig. 4, when crank 300 turns worm 302 and gears 304 and 308 in a direction to move rack 320 to the right and rack 322 to the left, links 336 and 338 are moved to the right and to the left, respectively. As is seen in Fig. 2, this will cause the bell crank 346 to pivot in a counterclockwise direction and cause links 356 to move upwardly. This moves rack 366 upwardly. Upward movement of rack 366 causes sectors 372 to rotate in a counterclockwise direction about pins 374 as viewed in Figs. 3 and 11. This moves the sector arms 378 to the left as viewed in Figs. 3 and 11 and pushes hinge 260 to the left or in a clockwise direction about pivot pin 278. This opens the window sashes by pushing the lower ends thereof outwardly away from the frame. When it is desired to close the windows, crank 300 is turned in the opposite direction and the linkage movement is reversed to close the window sashes.

An important feature of the present invention is the fact that the above described linkage operates to close the sashes completely even through one of the sashes is jammed in a partially open position. The manner in which this is accomplished can be best explained by reference to Fig. 11. Toothed sector 372 is provided with an aperture 390 in the center thereof but positioned toward arm 378 and the teeth. A shear slit 392 is formed in the material of sector 372 between the teeth of the sector and arm 378 and communicating with aperture 390. Normally the edges of the slit 392 abut each other so that there is no relative movement therebetween and thus any tendency to cause noise by chattering is eliminated.

When the associated window sash is jammed in the opened position as illustrated in Fig. 11, rack 366 and channel 362 would be prevented from moving downwardly to the closed position unless some compensating mechanism was provided. The compensating mechanism is provided in the present invention by the slit 392 in sector 372. If the associated sash should jam, rack bar 366 can continue to move downwardly because sector 372 can yield opening slit 392 as illustrated. This yielding is limited to the elastic limits of the material from which sector 372 is formed so that the edges of slit 392 will meet when the force exerted through rack 366 on sector 372 is removed. The elastic limit of the metal used cannot be exceeded when all three sashes are closed since the force exerted by six sectors 372 can overpower the operating mechanism described above.

Figure 2A:
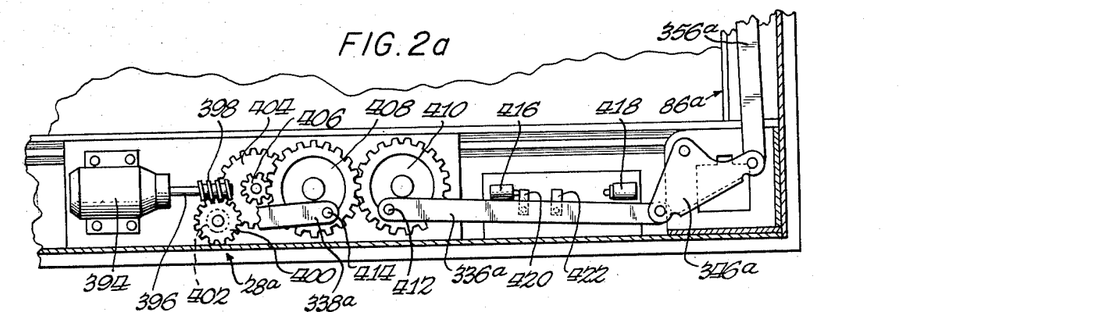
Fig. 2A is a view similar to Fig. 2 and illustrates a modified sash operating mechanism including an electrical drive.

An electrical window operating mechanism is illustrated in Fig. 2A of the drawings. In this form of window operating mechanism a motor 394 is provided having an output shaft 396. Motor 394 is mounted within the sill 28a. The end of shaft 396 carries a worm 398 which meshes with a worm gear 400. Gear 400 carries on its shaft a gear 402 shown in dotted lines which meshes with a gear 404 which in turn carries a smaller gear 406. Gear 406 meshes with and drives a gear 408 which in turn meshes with and drives a gear 410 having the same number of teeth and same diameter as gear 408. A link 336a is pivotally connected as at 412 to gear 410 and the link 338a is pivoted as at point 414 to gear 408. The links 336a and 338a correspond to links 336 and 338, respectively, described above and drive sash operating mechanism identical with those described above.

When the motor 394 is rotated in one direction, it moves links 336a and 338a outwardly away from the center of the window frame and causes the sash operating mechanism to open the sashes. When the motor is rotated in the opposite direction, the direction of movement of the sash operating mechanism is reversed to close the window sashes. A 180 degree rotation of the gears 408 and 410 gives full opening and closing movement to the connected window sashes. In order to limit the movement of gears 408 and 410 to a 180 degree revolution a pair of limit switches 416 and 418 are provided which are actuated by members 420 and 422, respectively, carried by link 336a. Limit switch 416 serves to shut off motor 394 automatically when the window sashes are in the closed position and switch 418 serves to deenergize and turn off motor 394 when the windows arrive at the fully opened position.

One of the important advantages of the present invention is the convenience of shipping the windows and the ease with which the windows can be assembled at the point of installation. The frame consisting of the sill 28, the head 30 and the jambs 32 and 34 can be shipped disassembled in a very compact manner. When the parts arrive at the place of installation these frame members can be readily assembled in a true manner due to the corner construction illustrated and described in Figs. 14 and 15. More particularly the interfitting of the inner outline of sill 28 with the plates 128 positioned on the vertical jambs insures that the lower corners are true. Assembly at this corner is accomplished by simply fitting the end of frame 28 over plate 128 and inserting the screws 144. Assembly of the upper corners of the frame is accomplished by inserting screws 182 through head 30 making connection with the corner bracket 178. Alignment is assured due to the interfitting of the parts and assembly is accomplished by inserting a total of fourteen screws.

The assembled window frame is then inserted in position and secured in any desired manner. The sill 28 can be backed up by a masonry piece 424 (see Fig. 3) which is provided with a finishing sill piece 426.

If desired, the frame can be shipped assembled. In any event the window sashes and the operating linkage are preferably shipped separately.

After the window frame has been installed on the job, the mounting channel 274 (see Fig. 13) can then be readily assembled on the frame by simply inserting the screws 276 thus securely mounting channels 274 on each side of the frame. The window sashes are then hung on the hinges 260 by inserting two screws 270 through each of the hinges into the window sashes.

The sash operating mechanism can next be installed by removing the sill cover 46 and the jamb covers 106. Crank 300 and associated parts are then installed within sill 28. The channels 362 are then positioned in the jambs and connected to the links 336 and 338 in the sill 28. When the covers 46 and 106 are replaced, the window is completely installed and ready for operation.

Water tight joints between the frame and the surrounding masonry or wall can be insured by providing a sealing compound at the corners. A water tight seal between the window sashes and the frame is insured by providing weatherstripping completely surrounding the frame and on the meeting rails intermediate the top and bottom of the frame. The rain cap 42 also aids in preventing rain and moisture from gaining access from the top of the window over the uppermost sash.

It is to be noted that fiber inserts have been provided between aluminum parts which slide with respect to each other to prevent wear and galling. Inserts and bushings have been provided between parts which rotate relative to each other also to minimize wear and galling and to avoid aluminum to aluminum contact.

It will be seen that there has been provided a window structure and operating mechanism therefor which fulfills all of the objects and advantages set forth above. Although certain preferred embodiments of the invention have been shown for purposes of illustration, it is to be understood that various changes and modifications can be made therein without departing from the spirit and scope thereof. The invention is to be limited only as set forth in the following claims.

I claim:

1. An awning window structure comprising a frame, a window sash pivotally mounted on said frame for swinging movement toward and away from said frame, a toothed sector mounted on a pivot fixed with respect to said frame, an arm formed integral with said sector and connected to said sash, said sector having a shear slit formed therein adjacent said arm and communicating with an aperture in the body of said sector to form an area of reduced cross section, and sash operating mechanism engaging said toothed sector to move said sash toward and away from said frame, the shear slit and the area of reduced cross section of said sector permitting said sash operating mechanism to be moved to the fully closed position even though a portion of said sash is held outwardly away from said frame in a partially open position.

2. An awning window structure comprising a frame, a window sash pivotally mounted on said frame for swinging movement toward and away from said frame, a toothed sector mounted on a pivot fixed with respect to said frame, means connecting said sector and said sash, a toothed rack mounted on said frame for sliding movement with respect to the pivot point of said sector and having teeth thereon engaging the teeth on said sector, and rack actuating mechanism for moving said rack with respect to said sector to pivot said sector and swing said sash toward and away from said frame, said sector including yielding means permitting said rack to move to the fully closed position even though a portion of the sash is held outwardly away from said frame in a partially open position.

3. An awning window structure comprising a frame, a window sash pivotally mounted on said frame for swinging movement between an open and a closed position with respect to said frame, a toothed sector mounted adjacent each side of said sash on a pivot fixed with respect to said frame, means interconnecting each of said sectors with the adjacent side of said sash, a toothed rack engaging each of said sectors and mounted on said frame for sliding movement with respect to said sector pivot to pivot said sector to open and close said sash, operating means, and linkage connecting said operating means with each of said racks to cause simultaneous movement of said racks, said sectors including yielding means to permit said racks to be moved to the fully closed position even though a portion of said sash is held outwardly away from said frame in a partially open position.

4. An awning window structure comprising a frame having a sill and a pair of side jambs, a window sash pivotally mounted to said jambs for swinging movement to closed and open positions with respect to said frame, a bell crank mounted on each end of said sill adjacent the associated jamb, a toothed rack mounted on each of said jambs for sliding movement with respect thereto, a link interconnecting each of said racks and the associated bell crank, a toothed sector mounted on each of said jambs adjacent said racks and engaging the associated rack, means interconnecting each of said sectors with the associated side of said sash, and means mounted on said sill for moving said bell cranks to actuate said racks simultaneously to open and close said sash.

5. An awning window structure as set forth in claim 4, wherein each of said toothed sectors includes yielding means to permit the racks to be moved to the closed position even though a portion of the associated sash is held outwardly away from the frame in a partially open position.

6. An awning window structure as set forth in claim 4, wherein the means for moving the bell cranks includes a second pair of toothed racks, a link connecting one of said racks to one of the bell cranks and a second link connecting the other of said racks to the other bell crank, an operating handle, and gear means interconnecting said operating handle and said second set of toothed racks to cause said second set of toothed racks to be moved simultaneously and in opposite directions with respect to each other whereby to cause simultaneous movement of the racks engaging the toothed sectors to open and close the associated sash.

7. An awning window structure as set forth in claim 4, wherein an electrical motor is mounted in the sill, a gear train connected to the output of said motor, a link connecting said gear train to one of the bell cranks and a second link connecting said gear train to the other of said bell cranks, said gear train moving said bell cranks simultaneously and at the same rate upon operation of said motor to open and close the connected sash.

8. An awning window structure as set forth in claim 4, wherein an electrical motor is mounted in the sill, a gear train connected to the output of said motor, a link connecting said gear train to one of the bell cranks and a second link connecting said gear train to the other of said bell cranks, said gear train moving said bell cranks simultaneously and at the same rate upon operation of said motor to open and close the connecting sash, a limit switch to stop operation of said motor when said sash is in the fully closed position and a limit switch to stop said motor when said sash is in the fully opened position, and switch actuating means mounted on one of said links to control said limit switches.

9. A sash assembly for awning type window structure comprising a window sash, a channel-shaped mounting member positioned at each end of said sash, each of said mounting members including a pair of parallel flanges and a connecting wall, said window sash having a hinge projection formed on each end thereof and extending into a slot in the associated connecting wall and pivotally mounted on the associated parallel flanges, a toothed sector pivotally mounted on each pair of said parallel flanges between said parallel flanges, each sector having an arm formed integral therewith, a link for each sector pivotally connected at one end to the associated arm and extending through a slot in the associated connecting wall and pivotally attached to the adjacent edge of said sash.

10. A sash assembly as set forth in claim 9, wherein each sector has a shear slit formed therein adjacent the arm and communicating with an aperture in the body of the sector to form an area of reduced cross section whereby the toothed portion of a sector can be moved to the closed position even though a portion of the sash is held outwardly away from one of the mounting members in a partially open position.

References Cited in the file of this patent

UNITED STATES PATENTS

| | | |
|---|---|---|
| 352,181 | Burk | Nov. 9, 1886 |
| 732,809 | Zborowski | July 7, 1903 |
| 2,275,100 | Burnett | Mar. 3, 1942 |
| 2,282,531 | Schunk | May 12, 1942 |
| 2,326,549 | Miller | Aug. 10, 1943 |
| 2,575,655 | Clerk | Nov. 20, 1951 |
| 2,587,547 | Steingrubber | Feb. 26, 1952 |
| 2,637,547 | Schottenberg | May 5, 1953 |
| 2,654,921 | Blanchard | Oct. 13, 1953 |
| 2,674,451 | Tracy | Apr. 6, 1954 |
| 2,742,676 | Klee | Apr. 24, 1956 |

FOREIGN PATENTS

| | | |
|---|---|---|
| 583,577 | Great Britain | Dec. 20, 1946 |